Sept. 2, 1947.  G. A. BORG  2,426,590
HOSE COUPLING
Filed Sept. 9, 1944   2 Sheets-Sheet 2
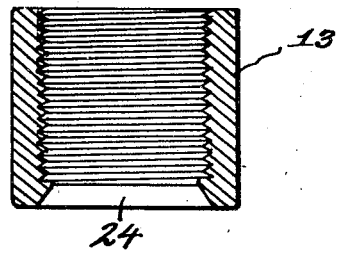
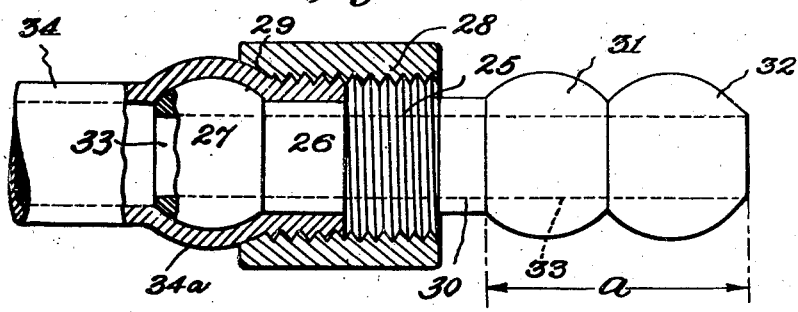
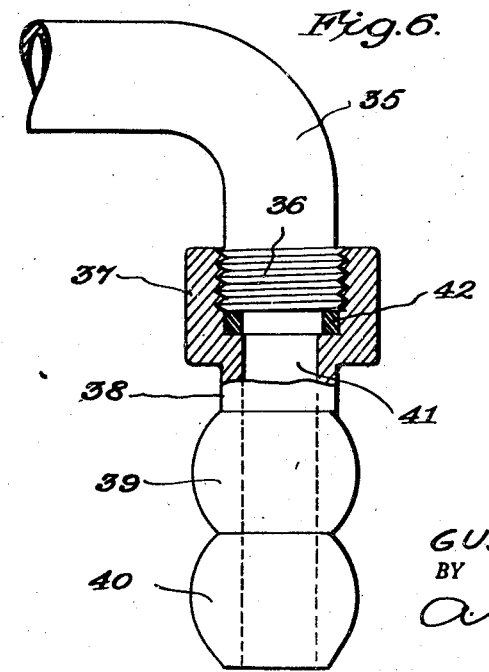
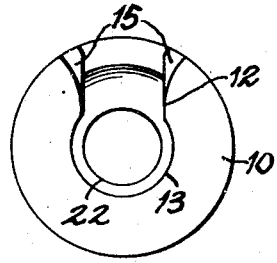
INVENTOR.
GUSTAVE A. BORG
BY
ATTORNEY Patented Sept. 2, 1947

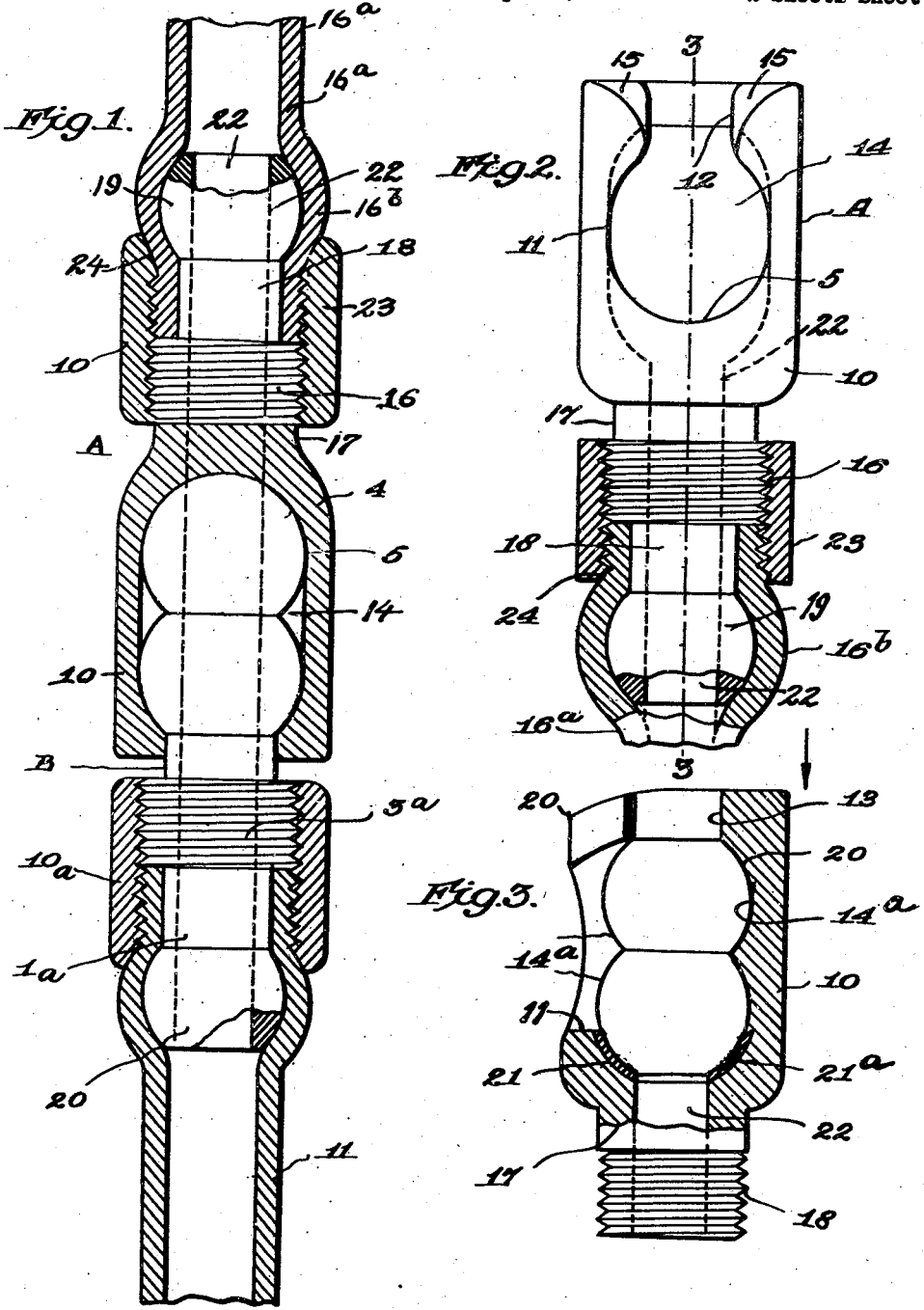

2,426,590

UNITED STATES PATENT OFFICE 2,426,590

HOSE COUPLING

Gustave A. Borg, Naugatuck, Conn.

Application September 9, 1944, Serial No. 553,332

11 Claims. (Cl. 285—86)

The invention relates to couplings and more particularly to hose couplings whereby a hose may be connected with a source of fluid such as water, or whereby a plurality of hose lengths may be connected together to constitute a single hose of increased length.

The invention has for its object to provide a coupling constructed in a novel manner to avoid the necessity for complicated and time-consuming connecting operations, and which may be operatively attached in any operative set-up within its range, in a minimum of time and with a minimum of effort.

The invention contemplates further the provision of a novel coupling capable of being operatively connected with associate elements in a simple manner to provide maximum efficiency in the connection.

A further object of the invention is to provide a novel coupling capable of being operatively utilized with maximum simplicity and without requiring the customary manipulation of extraneous tools and implements necessary in couplings of conventional type.

Another object of the invention is to provide a coupling of novel and simple form and operation in which the component parts may be constructed of plastics, and particularly adapted for use for coupling hose of the type exemplified by the conventional garden hose.

Other objects will appear from the description hereinafter and the features of novelty will be pointed out in the claims.

In the accompanying drawing, which illustrates examples of the invention without defining its limits, Fig. 1 is an external view with parts in section showing the novel coupling in use;

Fig. 2 is an elevation, partly in section, of one member of the novel coupling;

Fig. 3 is a longitudinal section thereof on the line 3—3 of Fig. 2;

Fig. 4 is an end view of the member shown in Fig. 2 looking in the direction of the arrow therein;

Fig. 5 is an external view partly in section of the associate member of the coupling in one form;

Fig. 6 is a similar view of the associate member in another form, and Fig. 7 is a sectional view of a sleeve included in the coupling.

As illustrated in the drawings, the novel coupling comprises two associate or co-operating members which, for convenience, may be designated as the female member and male member respectively.

The female member is illustrated in Fig. 2 and includes a hollow, preferably cylindrical body 10 provided with a surface opening 11 and a recess 12 of reduced width relatively to the opening 11. The recess 12 at its one end opens into the opening 11 and opens at its other end in the free end of the body 10 and in addition communicates radially with the end opening 13 thereof. The latter communicates with the interior chamber 14 of the hollow body 10, which chamber 14 is open also to the surface opening 11 and recess 12. To facilitate the connection of the coupling members with each other, as will appear hereinafter, the recess 12 preferably is formed with beveled surfaces 15. As shown in Fig. 3 the internal chamber 14 of body 10 is provided with a divided outer bearing surface 20 located upon opposite sides of the end opening 13 and a co-operating divided inner bearing surface 21 located upon opposite sides of an axial passage 22 formed in said body 10. If desired, the circumferential surface of the chamber 14 may be formed with compound curves 14—a, as shown in Fig. 3 although this arrangement is not absolutely necessary.

The female member of the coupling is provided with means for attaching it to a hose or other element. The illustrated example shows said member in attached association with a hose of the garden hose type, with the understanding that this is not intended to define utilitarian limitations.

The illustrated attaching means comprises an externally-threaded boss 16 connected with the body 10 by means of a neck 17 as shown in Figs. 2 and 3. A stem 18, preferably of cylindrical form projects outwardly from the boss 16 in axial registry with the major axis of the body 10. At its outer end the stem 18 terminates in an enlarged head 19, preferably of truncated spherical form and converging in opposite directions toward its free end and the stem 18 respectively. The neck 17, the boss 16, the stem 18 and the head 19 are formed with a continuous axial passage which constitutes a continuation of the axial passage 22, and terminates in the outer end face of the head 19. The attaching means under discussion further includes an internally-threaded sleeve 23 provided at its outer end with an internal annular beveled surface 24 as illustrated.

In attaching the female member of the coupling in operative position the head 19 and stem 18 are forced, for instance, into the end of hose 16—a to an extent to cause the end face of said hose 16—a to abut against and engage the surface of the boss 16. This causes the hose to be tensioned diametrically whereby its inherent elasticity develops a clamping force on said head 19 and stem 18. The sleeve 23 is then rotatively manipulated upon the boss 16 in a direction to adjust said sleeve over the end of the hose 16—a and to bring the annular beveled inner surface 24 of said sleeve into engagement with the portion of the hose 16—b which is outwardly bulged by the insertion of the head 19 into the same. As the sleeve 23 is thus manipulated it produces a thread upon that portion of the hose 16—a which is located in registry with the stem 18 and as the manipulation of said sleeve 23 is continued causes the beveled surface 24 thereof to develop a clamping force on the outwardly bulged portion 16—b of the hose 16—a to thereby clamp the latter against the head 19 and in surface clamping engagement with the stem 18. At the same time the threading of the hose 16—a by the sleeve 23 draws the end surface of said hose 16—a into firm engagement with the face of the boss 16 to provide a leak-proof joint thereat. The female member of the coupling is thereby firmly and securely fixed in the end of the hose 16—a against unintentional withdrawal therefrom.

The coupling further includes a male member which comprises an externally-threaded boss 25 from one face of which a preferably cylindrical stem 26 projects as shown in Fig. 5. The stem 26 terminates in a head 27 corresponding in form to the previously mentioned head 19. An internally-threaded sleeve 28 provided at one end with an internal annular beveled surface 29 and corresponding to the previously mentioned sleeve 23 is mounted in threaded engagement with the boss 25. A relatively short, preferably cylindrical, stem 30 extends from the opposite face of the boss 25 and terminates in a compound head consisting of truncated spherical sections 31 and 32 as shown in Fig. 5. An axial passage 33 extends through the male member of the coupling from end to end as shown in Fig. 5 for the purpose of establishing communication therethrough.

The male member of the coupling is connected, for instance, with a hose 34 by inserting the head 27 and stem 26 into the same until the end face of said hose 34 abuts against and engages the one face of the boss 25. The sleeve 28 is then manipulated on the boss 25 in a direction to thread the same upon the hose 34 in registry with the stem 26 and to bring the internal annular beveled surface 29 of said sleeve 28 into clamping engagement with the portion 34—a of said hose which is outwardly bulged by the head 27 located therein. In this way the male member of the coupling is firmly and securely connected with the hose 34 in the same way as the female member of the coupling is connected with the hose 16—a.

In the preferred arrangement the outer diameter of the stem 30 is slightly larger than the width of the recess 12 and of such dimension as to snugly fit the end opening 13 of the body 10. Similarly, the axial distance between the inner curved surface of the truncated section 31 and the outer curved portion of the truncated section 32, as indicated by the line a in Fig. 5, is slightly in excess of the axial distance between the bearing surfaces 20 and 21 of the body 10 of the female member of the coupling.

When it is desired to connect the male coupling member with the female coupling member the truncated sections 32 and 31 of the male coupling member are inserted angularly through the surface opening 11 of the body 10 to bring the short stem 30 into registry with the recess 12 of said body. The coupling members are then manipulated relatively to each other to force said stem 30 inwardly through the recess 12 and into the end opening 13 of the body 10 to thereby bring the truncated heads 32 and 31 into surface engagement respectively with the bearing surfaces 21 and 20 of the body 10, and thus to adjust the two coupling members into axial registry with each other. Because of the relative dimensions of the parts the stem 30 will thereby be snugly fitted into the end opening 13 of the body 10 and the truncated heads 32 and 31 will be firmly clamped in an axial direction between the bearing surfaces 21 and 20 of said body 10 to thereby firmly and securely couple the hose 16—a with the hose 34 in leak-proof communication with each other.

To disconnect the coupling members from each other said members are manipulated relatively to each other to force the stem 30 outwardly through the recess 12 beyond the body 10 to thereby enable the truncated spherical heads 31 and 32 to be withdrawn from the body 10 through the surface opening 11 thereof.

The coupling may include an associate male coupling member designed for instance for connection with a water or other faucet 35 of conventional form and including a customary externally-threaded boss 36 at its free end.

This associate coupling member, in such case, may comprise an internally-threaded socket 37 and a stem 38 projecting therefrom in an axial direction and terminating in truncated spherical heads 39 and 40 as shown in Fig. 6. An axial passage 41 extends through the socket 37, stem 38 and truncated heads 39 and 40. To prevent undesirable leakage a suitable gasket 42 may be mounted at the bottom of the socket 37.

In practice, the socket 37 is threaded upon the boss 36 of the faucet 35 until the gasket 42 is clamped between the end of the boss 36 and the bottom of the socket 37. At this stage the stem 38 and the heads 39 and 40 project from the faucet 35 in axial communicating relation therewith.

The stem 38 and the heads 39 and 40 correspond in dimensions and shape with the stem 30 and heads 31 and 32 of the male coupling member shown in Fig. 5. The hose to be coupled to or connected with the faucet 35 is provided with a coupling member of the type shown in Fig. 2 and is combined in associated relation with the faucet 35 by manipulating said female member of the coupling relatively to the stem 38 and heads 39 and 40 in the same way as described with respect to the connection of the coupling members shown in Figs. 2, 3 and 5 with each other.

The novel coupling reduces the operation of coupling one hose with another or of coupling a hose in connection with an associate element, such as a faucet, to the simplest operation and avoids the necessity for the use of extraneous tools or implements of any kind in these operations.

The component parts of the novel coupling may be made of any suitable material and are particularly adapted to be made from predetermined types of plastic.

In some cases a suitable packing in the form of a washer 21—a may be located in surface engagement with the inner bearing surface of the coupling member 10 as shown in Fig. 3.

Although the present invention has been described in conjunction with preferred embodiments, it is to be understood that modifications and variations may be resorted to without departing from the spirit of the invention, as those skilled in the art will readily understand. Thus, it is to be observed that the component parts of the couplings may be made of metal, wood, compositions and other suitable materials other than plastics. Such variations and modifications are considered to be within the purview and scope of the claims.

I claim:

1. A coupling of the kind described comprising a hollow body having a surface opening including a reduced open end and an outer end opening, and provided interiorly with surface sections upon opposite sides of said outer end opening co-operating to constitute an outer end interior bearing surface, an inner end interior bearing surface shaped to cooperate with said outer end interior bearing surface and located interiorly of said body at a predetermined distance therefrom for co-operation with said outer end interior bearing surface to develop a clamping leak-proof action on an associate coupling member, and means for connecting said hollow body with an element to be coupled.

2. A coupling of the kind described comprising a hollow body having a surface opening including a reduced open end, and an outer end opening in communication with said reduced open end, said hollow body further being provided interiorly with surface sections upon opposite sides of said outer end opening co-operating to constitute an outer end interior bearing surface, an inner end interior bearing surface shaped to cooperate with said outer end interior bearing surface and located interiorly of said body at a predetermined distance from said outer end interior bearing surface, means for connecting said hollow body to an element to be coupled, an associate coupling member including a stem insertable through said surface opening and reduced open end thereof into axial alinement with said hollow body and having axially-spaced bearing surfaces for interior surface engagement respectively with the outer end and inner end interior bearing surfaces of said hollow body, said axially spaced surfaces being axially separated to an extent slightly in excess of the distance between said outer end and inner end interior bearing surfaces whereby the latter develop a clamping action on said axially-spaced surfaces to fix said associate coupling member in axial leak-proof coupling connection with said hollow body, and means for connecting said associated coupling member with a second element to be coupled thereby to said first named element.

3. A coupling of the kind described comprising a stem provided with an axial passage and having axially-spaced exterior surfaces of predetermined form, means for attaching said stem to a fluid outlet as a coupling device in communication therewith, and an associate coupling member comprising a hollow body having an open end and a surface opening whereby said body is axially combined with said stem, and axially-spaced bearing surfaces interiorly of said body of the associate coupling member shaped for clamping surface engagement with the spaced exterior surfaces of said stem and spaced apart to develop a clamping action thereon interiorly of said body whereby said associate clamping member is coupled in axial connection with said stem.

4. A fluid-tight coupling of the kind described for the passage of fluids comprising a hollow female member and a hollow sphere-like male member making a slidable fluid-tight connection therewith whereby said male member capable of being instantly attached within and detached from said female member by hand without the aid of tools to provide a continuous, axial, fluid-tight connection for the passage of fluids.

5. A fluid-tight coupling of the kind described for the passage of fluids comprising a hollow female member, an internal chamber incorporated within said female member, an axial, fluid-tight passage provided at one end of said chamber, a recess with an opening at the other end thereof, and a hollow sphere-like male member having an axial passage and shaped to fit said internal chamber and to make a fluid-tight connection therewith, said male member being adapted to be instantly attached within and detached from said female member by hand without the aid of tools to provide a continuous, axial, fluid-tight connection for the passage of fluids.

6. A fluid-tight coupling of the kind described for the passage of fluids comprising a hollow female member, an internal chamber incorporated within said female member and provided with bearing surfaces, an axial, fluid-tight passage provided at one end of said chamber, a recess with an opening at the other end thereof, and a hollow male member making a detachable fluid-tight connection with said female member and having a compound head with at least one truncated spherical section, said section being adapted to make a fluid-tight connection with said bearing surfaces of said female member and being adapted to be instantly attached within and detached from said female member by hand without the aid of tools to provide a continuous, axial, fluid-tight connection for the passage of fluids.

7. A fluid-tight coupling of the kind described for the passage of fluids comprising a hollow female member, an internal chamber incorporated within said female member and provided with bearing surfaces, an axial, fluid-tight passage provided at one end of said chamber, a recess with an opening at the other end thereof, a hollow male member making a detachable fluid-tight connection with said female member and having a compound head with at least one truncated spherical section, said section being adapted to make a fluid-tight connection with said bearing surfaces of said female member and being adapted to be instantly attached within and detached from said female member by hand without the aid of tools to provide a continuous, axial, fluid-tight connection for the passage of fluids, and means operatively associated with each of said female and male members to provide connections with fluid-conducting means.

8. A fluid-tight coupling of the kind described for the passage of fluids comprising a hollow female member, an internal chamber incorporated within said female member and provided with at least one sphere-like bearing surface, an axial, fluid-tight passage located at one end of said chamber and extending through said female member, a recess located at the other end thereof, a surface opening in said female member extending from said recess toward the axial passage and connected with only a part of said internal chamber thereby imparting clamping action to the sides of said female member, and a hollow male member adapted to make a fluid-tight connection with said female member, said male member being provided with at least one truncated spherical section capable of making a fluid-tight connection with said sphere-like bearing surface and said male member being adapted to be instantly attached within the clamping sides of and detached from said female member by hand without the aid of tools to provide a continuous, axial, fluid-tight connection for the passage of fluids.

9. A fluid-tight coupling of the kind described for the passage of fluids comprising a hollow female member with sides capable of clamping, an internal chamber incorporated within said female member and provided with at least one sphere-like bearing surface, an axial, fluid-tight passage located at one end of said chamber and extending through said female member, a recess and associated opening located at the other end thereof, a surface opening in said female member extending from said recess toward the axial passage and connected with only a part of said internal chamber thereby imparting clamping action to the sides of said female member, a hollow male member adapted to make a fluid-tight connection with said female member, said male member being provided with at least one truncated spherical section between the curved surface of said section and being capable of making a fluid-tight connection with said sphere-like bearing surface and said male member being adapted to be instantly attached within the clamping sides of and detached from said female member by hand without the aid of tools to provide a continuous, axial, fluid-tight connection for the passage of fluids, and a stem containing an axial passage extending from said male member in an axial direction away from said female member and being slightly larger than the width of the recess and of such dimension as to snugly fit the end of the associated opening whereby said female member is outwardly bulged when the male member is inserted and a surface clamping engagement is developed to provide a fluid-tight and leak-proof connection, the distance between the junction of the stem and male member and the extremity of the spherical surface of said male member being slightly in excess of the axial distance from one end to the other of said internal chamber to aid in making said fluid-tight connection.

10. A fluid-tight coupling of the kind described for the passage of fluids comprising a hollow female member with sides capable of clamping, an internal chamber incorporated within said female member and provided with at least one sphere-like bearing surface, an axial, fluid-tight passage located at one end of said chamber and extending through said female member, a recess and associated opening located at the other end thereof, a surface opening in said female member extending from said recess toward the axial passage and connected with only a part of said internal chamber thereby imparting clamping action to the sides of said female member, a hollow male member, adapted to make a fluid-tight connection with said female member, said male member being provided with at least one truncated spherical section and being capable of making a fluid-tight connection with said sphere-like bearing surface and said male member being adapted to be instantly attached within the clamping sides of and detached from said female member by hand without the aid of tools to provide a continuous, axial, fluid-tight connection for the passage of fluids, and a stem containing an axial passage extending from said male member in an axial direction away from said female member and being slightly larger than the width of the recess and of such dimension as to snugly fit the end of the associated opening whereby said female member is outwardly bulged when the male member is inserted and a surface clamping engagement is developed to provide a fluid-tight and leaf-proof connection, the distance between the junction of the stem and male member and the extremity of the spherical surface of said male member being slightly in excess of the axial distance from one end to the other of said internal chamber to aid in making said fluid-tight connection, and a socket located at the end of said stem and provided with threads for screwing to corresponding threads of a faucet or the like.

11. A fluid-tight coupling of the kind described for the passage of fluids comprising a hollow female member with sides capable of clamping, an internal chamber incorporated within said female member and provided with at least one sphere-like bearing surface, an axial, fluid-tight passage located at one end of said chamber and extending through said female member, a recess and associated opening located at the other end thereof, a surface opening in said female member extending from said recess toward the axial passage and connected with only a part of said internal chamber thereby imparting clamping action to the sides of said female member, an axial passage in said female member at the end opposite said recess, a stem extending from said female member and having a passage in communication with said axial passage, a plurality of threads provided on said stem adjacent to said female member, an enlarged head at the free end of said stem for the tensioning of the end of a hose, a threaded sleeve adapted to be screwed on said threads and to clamp the end of said hose, a hollow male member adapted to make a fluid-tight connection with said female member, said male member being provided with at least one truncated spherical section and being capable of making a fluid-tight connection with said sphere-like bearing surface and said male member being adapted to be instantly attached within the clamping sides of and detached from said female member by hand without the aid of tools to provide a continuous, axial, fluid-tight connection for the passage of fluids, a stem containing an axial passage extending from said male member in an axial direction away from said female member and being slightly larger than the width of the recess and of such dimension as to snugly fit the end of the associated opening whereby said female member is outwardly bulged when the male member is inserted and a surface clamping engagement is developed to provide a fluid-tight and leak-proof connection, the distance between the junction of the stem and male member and the extremity of the spherical surface of said male member being slightly in excess of the axial distance from one end to the other of said internal chamber to aid in making said fluid-tight connection, a plurality of threads provided on said stem adjacent to said male member, an enlarged head at the free end of said stem for the tensioning of the end of a hose, and a threaded sleeve adapted to be screwed on said threads and to clamp the end of said hose.

GUSTAVE A. BORG.

REFERENCES CITED

The following references are of record in the file of this patent:

UNITED STATES PATENTS

| Number | Name | Date |
|---|---|---|
| 709,762 | Greaves | Sept. 23, 1902 |
| 2,333,349 | Weatherhead et al. | Nov. 2, 1943 |
| 862,578 | Muehlberg | Aug. 6, 1907 |
| 787,529 | Muehlberg | Apr. 18, 1905 |
| 1,962,060 | Emery | June 5, 1934 |
| 68,348 | Buchanan | Sept. 3, 1867 |

FOREIGN PATENTS

| Number | Country | Date |
|---|---|---|
| 121,314 | Great Britain | Dec. 19, 1918 |